US007212900B2

(12) United States Patent
Dominici

(10) Patent No.: US 7,212,900 B2
(45) Date of Patent: May 1, 2007

(54) METHOD OF REDUCING RESONANCE PHENOMENA IN A TRANSMISSION TRAIN OF A VEHICLE INTERNAL COMBUSTION ENGINE

(75) Inventor: Agostino Dominici, Debbia di Baiso (IT)

(73) Assignee: Ferrari S.p.A., Modena (IT)

( * ) Notice: Subject to any disclaimer, the term of this patent is extended or adjusted under 35 U.S.C. 154(b) by 635 days.

(21) Appl. No.: 10/748,219

(22) Filed: Dec. 31, 2003

(65) Prior Publication Data

US 2005/0009666 A1 Jan. 13, 2005

(30) Foreign Application Priority Data

Jan. 2, 2003 (IT) .......................... BO2003A0001

(51) Int. Cl.
*G06F 7/00* (2006.01)

(52) U.S. Cl. .............................. 701/54; 51/101; 51/111

(58) Field of Classification Search .................. 701/51, 701/55, 56, 58, 60, 65, 66, 101, 102, 105, 701/111; 123/352, 356, 406.19–406.44
See application file for complete search history.

(56) References Cited

U.S. PATENT DOCUMENTS 4,172,434 A 10/1979 Coles
5,016,591 A * 5/1991 Nanyoshi et al. ........ 123/406.2
5,080,066 A 1/1992 Takeno et al.
5,537,982 A * 7/1996 Milunas et al. ............ 123/492
6,615,797 B2 * 9/2003 Richard et al. ............ 123/352

FOREIGN PATENT DOCUMENTS

| | | |
|---|---|---|
| EP | 0 254 005 A1 | 1/1988 |
| EP | 0 447 697 A2 | 9/1991 |
| EP | 1 260 693 A2 | 11/2002 |
| WO | WO 94/29585 A1 | 12/1994 |

* cited by examiner

*Primary Examiner*—Richard M. Camby
(74) *Attorney, Agent, or Firm*—Birch, Stewart, Kolasch & Birch, LLP

(57) ABSTRACT

A method of reducing resonance phenomena in a transmission train of an internal combustion engine of a vehicle; when the rotation speed of at least part of the transmission train is such that the frequency of a disturbance harmonic component of the drive torque lies in the neighborhood of a resonance frequency of the transmission train, the standard control mode of the cylinders is modified to modify the pattern of the drive torque as a function of the engine angle, and so modify the distribution of the harmonic components of the drive torque to reduce the amplitude of the disturbance harmonic component.

10 Claims, 3 Drawing Sheets

METHOD OF REDUCING RESONANCE PHENOMENA IN A TRANSMISSION TRAIN OF A VEHICLE INTERNAL COMBUSTION ENGINE

This Nonprovisional application claims priority under 35 U.S.C. § 119(a) on Patent Application No(s). B02003A 000001 filed in ITALY on Jan. 2, 2003, the entire contents of which are hereby incorporated by reference.

The present invention relates to a method of reducing resonance phenomena in a transmission train of a vehicle internal combustion engine.

BACKGROUND OF THE INVENTION

The internal combustion engine of a vehicle transmits power to the vehicle along a transmission train comprising a succession of components. For example, in a vehicle (as shown in FIG. 1) with a front engine, rear-wheel drive, and rear axle gearbox, the front engine is connected by the clutch to a propeller shaft which terminates inside the gearbox casing at the rear axle; and two axle shafts extend from the gearbox casing, and are each integral with a respective rear drive wheel which transmits its own part of the drive torque to the road surface. This type of transmission train is an elastic-torsional system, by comprising a series of high-inertia components (e.g. the drive shaft, flywheel and gearbox) and a series of highly elastic components (the propeller shaft and wheels).

Being an elastic-torsional system, the transmission train has intrinsic oscillation modes, each of which has its own resonance frequency. More specifically, the transmission train described has three intrinsic oscillation modes: a first characterized by a node at the engine, a node at the vehicle, and an antinode at the wheels; a second characterized by a node at the wheels; and a third characterized by a node at the engine, a node at the wheels, and an antinode at the gearbox. Using real-vehicle characteristics, the resonance frequencies of the first, second, and third intrinsic oscillation mode work out at around 4 Hz, 8 Hz, and 75 Hz respectively.

An internal combustion engine has a finite number of cylinders, each of which generates a torque pulse for every two complete rotations of the drive shaft, so that the torque transmitted from the engine to the vehicle by the transmission train has a pattern varying as a function of the engine angle, and which can be modelled by superimposing a constant mean value and a series of harmonics. For example, an 8-cylinder internal combustion engine has a torque pattern as shown in FIG. 2, and harmonics of the fourth, eighth, twelfth, sixteenth . . . order, as shown in FIG. 3. The only harmonic of relatively high amplitude, however, is the fourth-order one (in an eight-cylinder engine, the amplitude of the eighth-order harmonic is roughly a quarter of that of the fourth-order harmonic). At 1000 rpm, the drive shaft has a frequency of 16.67 Hz, so that the fourth harmonic has a frequency of 66.67 Hz; at 1200 rpm, the drive shaft has a frequency of 20 Hz, so that the fourth harmonic has a frequency of 80 Hz.

When an eight-cylinder internal combustion engine goes from 1000 to 1200 rpm, the frequency of the fourth harmonic of the drive torque transmitted from the engine to the transmission train therefore increases from 66.67 Hz to 80 Hz, i.e. through the roughly 75 Hz resonance frequency of the third intrinsic oscillation mode of the transmission train. When the frequency of the drive torque fourth harmonic is in the neighbourhood of the resonance frequency of the third intrinsic oscillation mode, resonance phenomena occur, which have the antinode at the gearbox, and which generate annoying mechanical noise in the gearbox which is clearly audible by the driver of the vehicle. The reason for this is that, at around 1100 rpm, the engine is close to idling, i.e. vehicle speed is low, if not zero, so that the noise of the vehicle itself (aerodynamic noise, wheel rolling noise, engine noise) is extremely low and not enough to conceal the mechanical noise generated by resonance phenomena.

To eliminate the mechanical noise generated by resonance phenomena as described above, it has been proposed to equip the transmission train with high-torsional-elasticity members, which reduce the effects of resonance phenomena and lower the resonance frequency of the third intrinsic oscillation mode to values corresponding to below-idling engine speeds, i.e. to speeds not actually used by the engine. Such high-torsional-elasticity members may be defined by torsional dampers—which, however, often fail to provide for a sufficient reduction in the resonance frequency of the third intrinsic oscillation mode—or by a damped double flywheel of the type described in U.S. Pat. No. 5,755,143 or U.S. Pat. No. 6,306,043.

Though substantially successful in sufficiently reducing the resonance frequency of the third intrinsic oscillation mode, a damped double flywheel is expensive, bulky, and heavy, and impairs engine response, which is a major drawback in racing vehicles.

SUMMARY OF THE INVENTION

It is an object of the present invention to provide a method of reducing resonance phenomena in a transmission train of a vehicle internal combustion engine, which is cheap and easy to implement, and which at the same time provides for eliminating the aforementioned drawbacks.

According to the present invention, there is provided a method of reducing resonance phenomena in a transmission train of a vehicle internal combustion engine, as claimed in claim 1.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
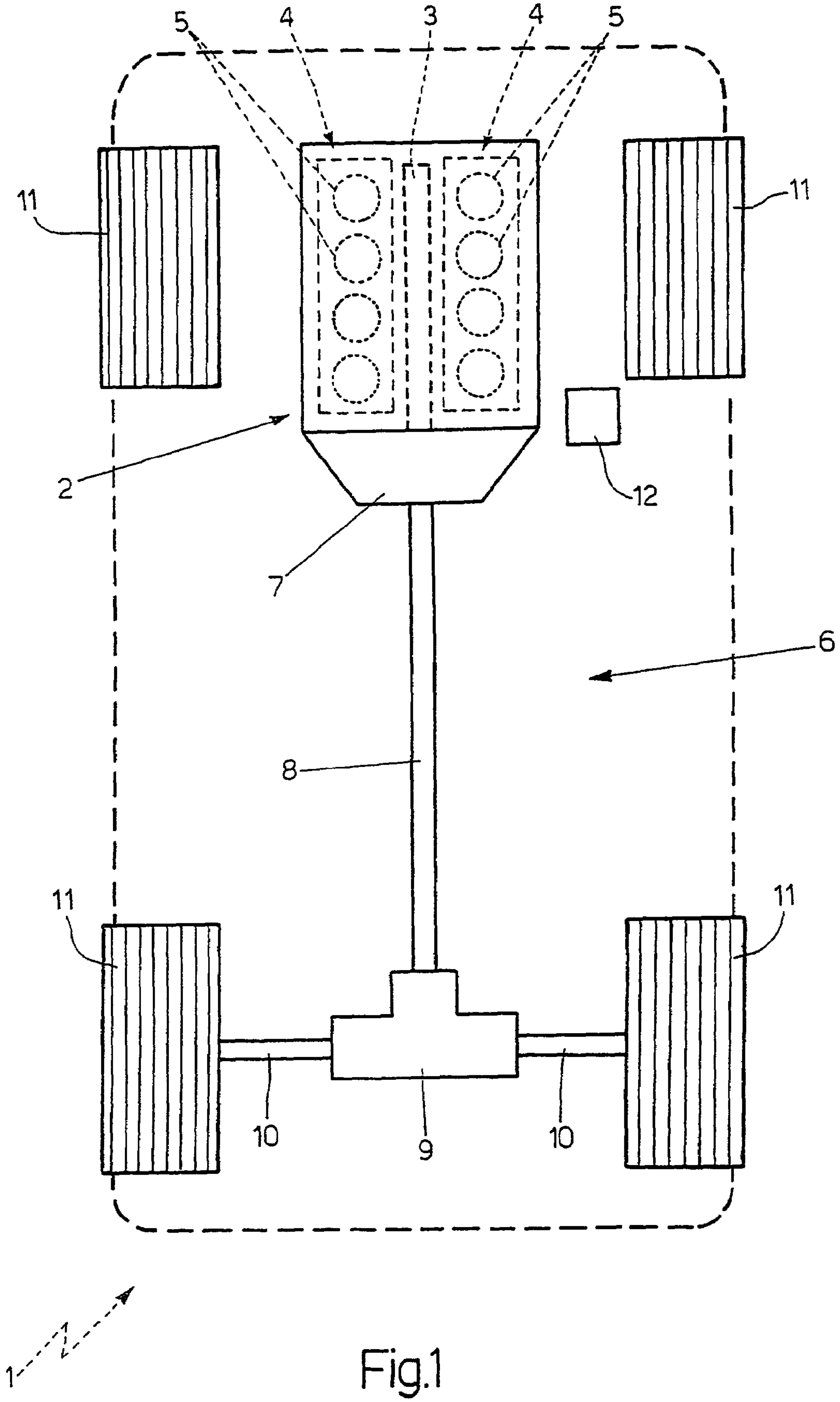
FIG. 1 shows a schematic view of a vehicle with a front internal combustion engine, rear-wheel drive, and rear axle gearbox, and implementing the method of reducing resonance phenomena according to the present invention.

Number 1 in FIG. 1 indicates as a whole a vehicle comprising a front internal combustion engine 2 having a drive shaft 3 and two rows 4 of four cylinders 5 each. In actual use, engine 2 produces at drive shaft 3 a drive torque T which is transmitted to the road surface by a transmission train 6 to move vehicle 1.

Transmission train 6 comprises a clutch 7, which is integral with engine 2 and connects drive shaft 3 to a propeller shaft 8 terminating in a gearbox 9 at the rear axle; and two axle shafts 10 extend from gearbox 9, and are each integral with a respective rear drive wheel 11.

Transmission train 6 has three intrinsic oscillation modes: a first characterized by a node at engine 2, a node at vehicle 1, and an antinode at rear drive wheels 11; a second characterized by a node at rear drive wheels 11; and a third characterized by a node at engine 2, a node at rear drive wheels 11, and an antinode at gearbox 9. Using real-vehicle characteristics, the resonance frequencies Fr of the first, second, and third intrinsic oscillation mode work out at around 4 Hz, 8 Hz, and 75 Hz respectively.

Figure 2:
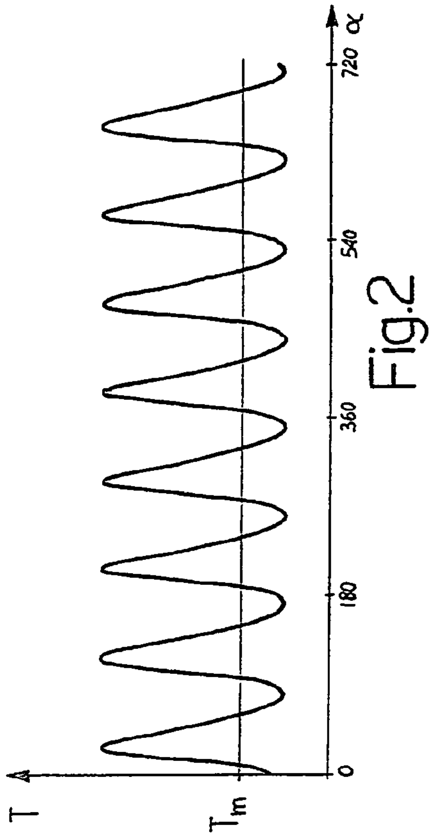
FIG. 2 shows a graph of the drive torque produced by the FIG. 1 internal combustion engine as a function of the engine angle and in a normal operating condition.
Figure 3:
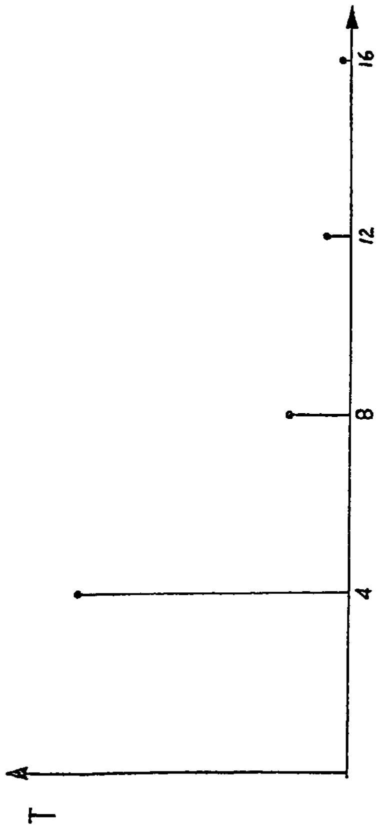
FIG. 3 shows the amplitude of the FIG. 2 drive torque harmonics.

As shown in FIG. 2, cylinders 5 are normally controlled in a standard control mode by a central control unit 12 to generate drive torque T, which has a pulsating pattern as a function of the engine angle $\alpha$, i.e. has eight peaks for every 720° rotation of drive shaft 3 (i.e. for every two complete turns of drive shaft 3, during which each of the eight cylinders 5 generates a respective thrust). The drive torque T generated in the standard control mode can be divided into the sum of a constant value Tm (equal to the mean drive torque T value) and a series of sinusoidal harmonic components C. FIG. 3 shows the amplitude of some of the harmonic components C of the FIG. 2 drive torque T. As can be seen, drive torque T has harmonic components C of the fourth ($C_4$), eighth ($C_8$), twelfth ($C_{12}$), sixteenth ($C_{16}$) . . . order, but the only harmonic component C of relatively high amplitude is the fourth-order harmonic component $C_4$. At 1000 rpm, drive shaft 3, clutch 7, propeller shaft 8, and part of gearbox 9 have a frequency of 16.67 Hz, so that the fourth-order harmonic component $C_4$ has a frequency of 66.67 Hz; at 1200 rpm, drive shaft 3, clutch 7, propeller shaft 8, and part of gearbox 9 have a frequency of 20 Hz, so that the fourth-order harmonic component $C_4$ has a frequency of 80 Hz.

When engine 2 goes from 1000 to 1200 rpm, the frequency of the fourth-order harmonic component $C_4$ of the drive torque T transmitted from engine 2 to transmission train 6 therefore increases from 66.67 Hz to 80 Hz, i.e. through the roughly 75 Hz resonance frequency Fr value of the third intrinsic oscillation mode of transmission train 6. When the frequency of the fourth-order harmonic component $C_4$ of drive torque T is in the neighbourhood of the resonance frequency Fr of the third intrinsic oscillation mode, resonance phenomena occur, which have the antinode at gearbox 9, and which generate annoying mechanical noise in the gearbox which is clearly audible by the driver of the vehicle.

To reduce such resonance phenomena, when the rotation speed N of drive shaft 3 is such that the frequency of the fourth-order harmonic component $C_4$ of drive torque T is in the neighbourhood of the resonance frequency Fr of transmission train 6, central control unit 12 modifies the standard control mode of cylinders 5, so as to alter the standard drive torque T pattern as a function of engine angle $\alpha$, and so modify the harmonic components C of drive torque T to reduce the amplitude of the fourth-order harmonic component $C_4$.

Figure 4:
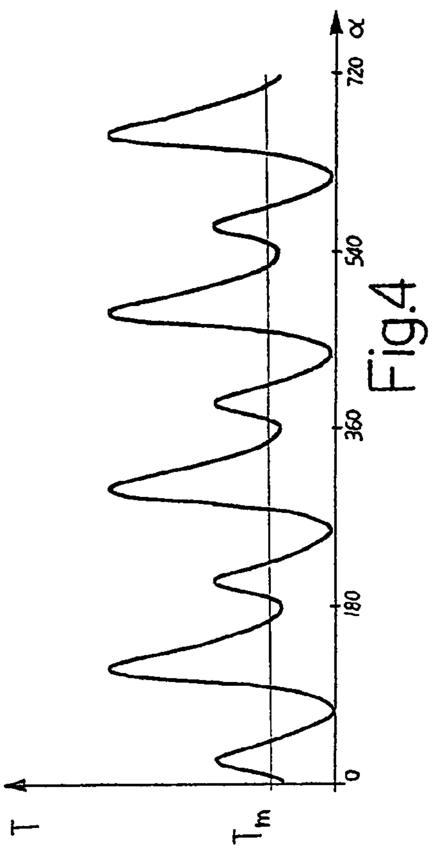
FIG. 4 shows a graph of the drive torque produced by the FIG. 1 internal combustion engine as a function of the engine angle and in a particular operating condition.
Figure 5:
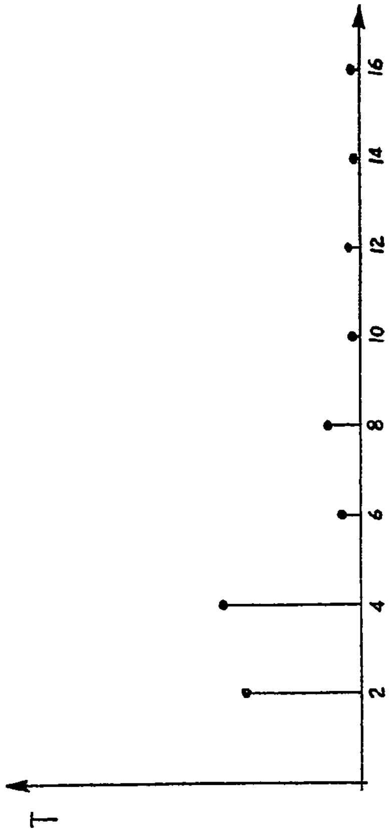
FIG. 5 shows the amplitude of the FIG. 4 drive torque harmonics.

As shown in FIG. 4, operation of cylinders 5 in one row 4 is reduced 50% with respect to cylinders 5 in the other row 4. This produces a roughly 30% reduction in the mean value Tm of drive torque T, but above all, as shown in FIG. 5, produces a variation in the harmonic components C of drive torque T, with a marked reduction in the amplitude of the fourth-order harmonic component $C_4$. A comparison of FIGS. 3 and 5 shows a marked reduction in the amplitude of the fourth-order harmonic component $C_4$, and the appearance of a second-order harmonic component $C_2$ and a sixth-order harmonic component $C_6$ (the higher-order harmonic components C have substantially no effect), thus greatly reducing the resonance phenomena caused by the fourth-order harmonic component $C_4$. As can be seen, when the rotation speed N of drive shaft 3 is such (1000–1200 rpm) that the frequency (68–80 Hz) of the fourth-order harmonic component $C_4$ of drive torque T is in the neighbourhood of the resonance frequency Fr (about 75 Hz) of transmission train 6, the frequency (33–40 Hz) of the second-order harmonic component $C_2$ and the frequency (100–120 Hz) of the sixth-order harmonic component $C_6$ of drive torque T are relatively distant from the resonance frequency Fr (about 75 Hz) of transmission train 6, so that the second-order harmonic component $C_2$ and sixth-order harmonic component $C_6$ of drive torque T produce no resonance of any sort in transmission train 6.

In other words, the resonance phenomena generated in transmission train 6 by the fourth-order harmonic component $C_4$ of drive torque T are generated within a given rotation speed N range of drive shaft 3 centered about the resonance frequency Fr of transmission train 6. When rotation speed N lies within this range, central control unit 12 modifies the standard control mode of cylinders 5, so as to alter the standard drive torque T pattern as a function of engine angle $\alpha$, and so modify the harmonic components C of drive torque T to reduce the amplitude of the fourth-order harmonic component $C_4$. The amplitude of the fourth-order harmonic component $C_4$ is reduced by introducing other harmonic components C (second-order harmonic component $C_2$ and sixth-order harmonic component $C_6$) which do not give rise to resonance phenomena in the rotation speed N range in which the fourth-order harmonic component $C_4$ is responsible for producing resonance phenomena in transmission train 6.

Figure 6:
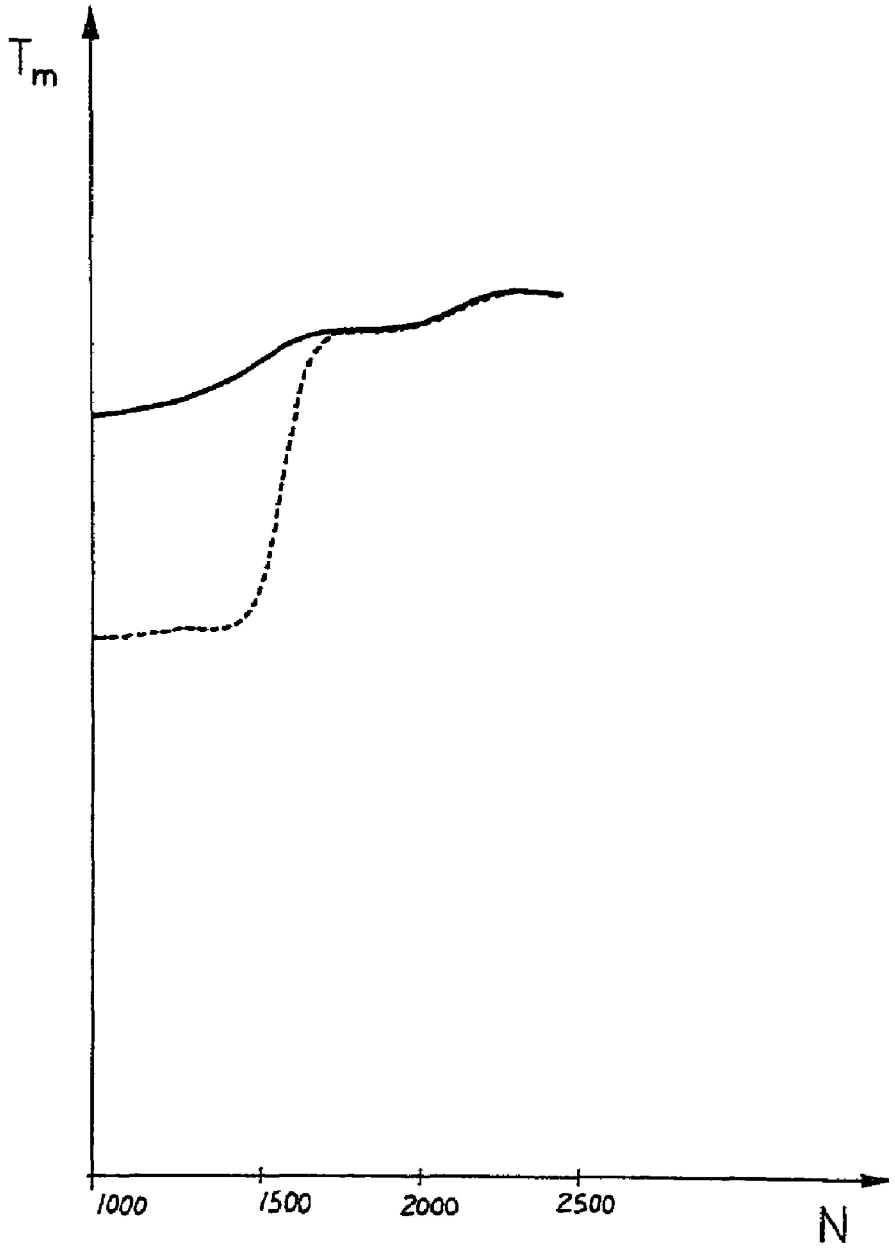
FIG. 6 shows the mean drive torque value as a function of engine speed in the normal operating condition in FIG. 2 and in the particular operating condition in FIG. 4.

FIG. 6 shows a graph of mean drive torque Tm as a function of rotation speed N of drive shaft 3. More specifically, the continuous line shows the mean drive torque Tm pattern when cylinders 5 are controlled in standard control mode, and the dash line the mean drive torque Tm pattern when the control mode of cylinders 5 is modified by a 50% reduction in operation of one row 4 of cylinders 5 to alter the distribution of harmonic components C of drive torque T. Obviously, over and above a given rotation speed N of drive shaft 3 (1500 rpm in FIG. 6), the standard control mode is restored to ensure a maximum mean drive torque Tm value. It should be stressed that the 50% reduction in operation of part of cylinders 5 does not produce a reduction in the performance of engine 2 actually noticeable by the driver, on account of the consequent reduction in mean drive torque Tm being located within a rotation speed N range of drive shaft 3 which is substantially unused when driving, particularly racing, vehicle 1.

Operation of cylinders 5 in one row 4 is reduced 50% with respect to cylinders 5 in the other row 4 by reducing the corresponding amount of fuel injected, by modifying the corresponding injection lead, by modifying the corresponding phase of the intake and/or exhaust valves, and/or by modifying the opening of the corresponding butterfly valve (known and not shown).

The standard control mode of cylinders 5 is modified by central control unit 12 when the rotation speed N of drive shaft 3 is such that the frequency of the fourth-order harmonic component $C_4$ of drive torque T lies in the neighbourhood of resonance frequency Fr of transmission train 6; which neighbourhood is typically centered at resonance frequency Fr, and ranges in amplitude between 4 and 16 Hz (corresponding to 60–240 rpm) and more specifically between 4 and 8 Hz (corresponding to 60–120 rpm).

Obviously, to enhance reduction of the above resonance phenomena in transmission train 6, in addition to the method according to the present invention, transmission train 6 may also be equipped with high-torsional-elasticity members, particularly torsional dampers, which are light, cheap, and produce no noticeable impairment in response of engine 2.

The invention claimed is:

1. A method of reducing resonance phenomena in a transmission train (6) of a vehicle internal combustion engine (2); the internal combustion engine (2) having a number of cylinders (5) normally controlled in a standard control mode to generate a drive torque (T), which has a standard pulsating pattern as a function of the engine angle ($\alpha$), and has at least one disturbance harmonic component ($C_4$); the transmission train (6) having an intrinsic resonance mode having a given resonance frequency (Fr); and the method providing for modifying the standard control mode of the cylinders (5) to modify the standard pattern of the drive torque (T) as a function of the engine angle ($\alpha$), and so modify the distribution of the harmonic components (C) of the drive torque (T) to reduce the amplitude of the disturbance harmonic component ($C_4$) when the rotation speed (N) of at least part of the transmission train (6) is such that the frequency of the disturbance harmonic component ($C_4$) of the drive torque (T) lies in the neighbourhood of the resonance frequency (Fr) of the transmission train (6).

2. A method as claimed in claim 1, wherein the standard control mode of the cylinders (5) is modified by reducing operation of a number of cylinders (5) with respect to the other cylinders (5).

3. A method as claimed in claim 2, wherein operation of a number of cylinders (5) is reduced by reducing the corresponding quantity of fuel injected.

4. A method as claimed in claim 2, wherein operation of a number of cylinders (5) is reduced by modifying the corresponding injection lead.

5. A method as claimed in claim 2, wherein operation of a number of cylinders (5) is reduced by modifying the corresponding phase of the intake and/or exhaust valves.

6. A method as claimed in claim 2, wherein operation of a number of cylinders (5) is reduced by modifying the opening of the corresponding butterfly valve.

7. A method as claimed in claim 2, wherein the cylinders (5) of the engine (2) are divided into two rows (4) arranged in a “V”; the standard control mode of the cylinders (5) being modified by reducing operation of the cylinders (5) in one row (4) with respect to the cylinders (5) in the other row (4).

8. A method as claimed in claim 7, wherein operation of the cylinders (5) in one row (4) is reduced 50% with respect to the cylinders (5) in the other row (4).

9. A method as claimed in claim 1, wherein the standard control mode of the cylinders (5) is modified when the rotation speed (N) of at least part of the transmission train (6) is such that the frequency of the disturbance harmonic component ($C_4$) of the drive torque (T) lies in the neighbourhood of the resonance frequency (Fr) of the transmission train (6); the neighbourhood being centered at the resonance frequency (Fr), and having an amplitude ranging between 4 and 16 Hz.

10. A method as claimed in claim 1, wherein the standard control mode of the cylinders (5) is modified when the rotation speed (N) of at least part of the transmission train (6) is such that the frequency of the disturbance harmonic component ($C_4$) of the drive torque (T) lies in the neighbourhood of the resonance frequency (Fr) of the transmission train (6); the neighbourhood being centered at the resonance frequency (Fr), and having an amplitude ranging between 4 and 8 Hz.

* * * * *